(12) United States Patent
Wang et al.

(10) Patent No.: US 7,181,318 B2
(45) Date of Patent: Feb. 20, 2007

(54) APPARATUS AND METHOD FOR ADJUSTING SPEED OF COOLING FAN OF ELECTRONIC EQUIPMENT BASED ON GEOGRAPHIC PARAMETERS

(75) Inventors: Bang-Ji Wang, Taoyuan (TW); Chang-Chien Li, Taoyuan (TW); Tsung-Hsun Wu, Taoyuan (TW)

(73) Assignee: Benq Corporation, Taoyuan (TW)

( * ) Notice: Subject to any disclaimer, the term of this patent is extended or adjusted under 35 U.S.C. 154(b) by 0 days.

(21) Appl. No.: 11/335,300

(22) Filed: Jan. 18, 2006

(65) Prior Publication Data

US 2006/0161308 A1   Jul. 20, 2006

(30) Foreign Application Priority Data

Jan. 19, 2005   (TW) .............................. 94101497 A

(51) Int. Cl.
*G05B 21/00* (2006.01)
(52) U.S. Cl. .................................................... 700/278
(58) Field of Classification Search ................ 700/276, 700/278, 282, 299, 300, 301, 302
See application file for complete search history.

(56) References Cited

U.S. PATENT DOCUMENTS

| 5,511,724 A * | 4/1996 | Freiberger et al. .......... 236/49.3 |
| 5,553,661 A * | 9/1996 | Beyerlein et al. ............ 165/203 |
| 6,454,178 B1 * | 9/2002 | Fusco et al. ................ 236/49.3 |

* cited by examiner

*Primary Examiner*—Leo Picard
*Assistant Examiner*—Chad Rapp
(74) *Attorney, Agent, or Firm*—Birch, Stewart, Kolasch & Birch, LLP

(57) ABSTRACT

The invention discloses an electronic equipment including a cooling module, a receiving module, and a controller. The receiving module is used for receiving at least one geographic parameter relative to a location where the electronic equipment is located. The controller is used for controlling the cooling module with a predetermined manner corresponding to the at least one geographic parameter.

15 Claims, 6 Drawing Sheets

APPARATUS AND METHOD FOR ADJUSTING SPEED OF COOLING FAN OF ELECTRONIC EQUIPMENT BASED ON GEOGRAPHIC PARAMETERS

BACKGROUND OF THE INVENTION

1. Field of the Invention

The present invention relates to an electronic equipment, and more particularly to an electronic equipment capable of adjusting the speed of a cooling fan therein.

2. Description of the Prior Art

In electrical apparatus, cooling fans play an important role in maintaining their operational capabilities. The inability to remove excessive heat from electrical apparatus may lead to permanent damage of the apparatus. Because of the complexity of existing electrical apparatus, cooling fans having added functionalities other than just providing cooling air, such as the ability to control the speed of a fan, the ability to monitor a tachometer pulse on a fan to determine instantaneous fan speed, and the ability to detect if a fan has failed or is slower than its preset speed, are required.

Generally, an electrical apparatus, such as small electronic equipment including a multi-functional and high-performance personal computer, incorporates a microprocessing unit (MPU), as a functional part thereof. However, this MPU generates heat and is destroyed by the heat at temperatures more than approx. 90.degree. C. Thus, the MPU is equipped with a cooling device to radiate the heat generated in the MPU and provide safety for the electronic equipment. A desired cooling device is of a small type. However, a typical cooling module that has heat-radiating fins cannot provide sufficient cooling. Therefore, a cooling device has been proposed that has a small cooling fan as a main constituent component and is formed as a cooling module.

Another concern involving conventional cooling fans is that the environmental factors, such as room temperature, atmospheric pressure, humidity, and so on, will also influence heat-radiating effect for the electronic equipment.

Therefore, the objective of the present invention is to provide an electronic equipment capable of adjusting the speed of a cooling fan to solve the above-mentioned problems.

SUMMARY OF THE INVENTION

The objective of the present invention is to provide an electronic equipment capable of adjusting the speed of a cooling fan therein based on a geographic parameter and a temperature.

The present invention discloses an electronic apparatus including a receiving module, a function determining module, a thermo sensor, a speed determining module, and a controller. The receiving module is used for receiving at least one geographic parameter relative to a location where the electronic equipment is located. According to the at least one geographic parameter, the function determining module is used for loading a function of speed versus temperature. The thermo sensor is used for sensing a temperature in the electronic equipment. The speed determining module is used for calculating an adjusted value by applying the temperature in the function. According to the adjusted value, the controller is used for controlling the speed of the cooling fan.

Compared to the prior art, the electronic equipment of the present invention utilizes the receiving module to receive at least one geographic parameter and then, based on the received geographic parameter and the temperature of the electronic equipment, calculates an adjusted value to control the speed of the cooling fan, so as to effectively radiate heat from the electronic equipment. Accordingly, the geographic parameters, which are relative to the location where different electronic equipment is located, are considered for heat radiating. In other words, no matter where the electronic equipment is located, the present invention can always radiate heat effectively based on the geographic parameters, such as a longitude, a latitude, or an altitude relative to the location.

The advantage and spirit of the invention may be understood by the following recitations together with the appended drawings.

BRIEF DESCRIPTION OF THE APPENDED DRAWINGS

DETAILED DESCRIPTION OF THE INVENTION

Figure 1:
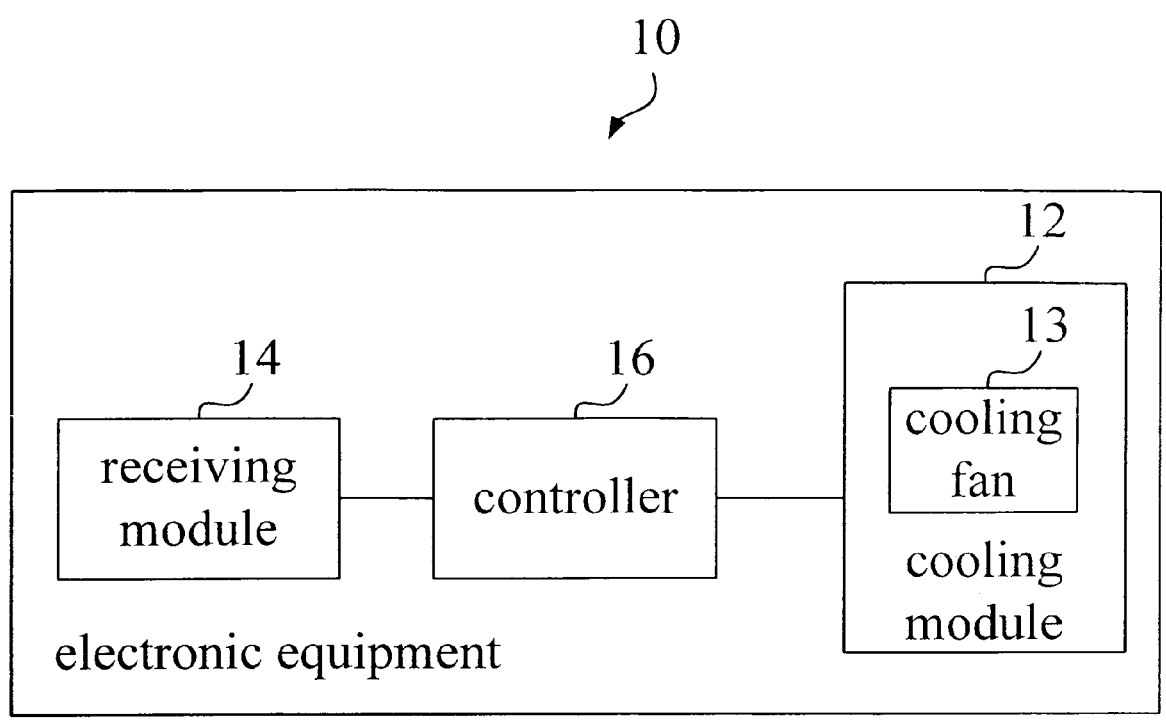
FIG. 1 is a system block diagram illustrating an electronic equipment according to a preferred embodiment of the present invention.

Referring to FIG. 1, FIG. 1 is a functional block diagram illustrating an electronic equipment 10 according to a preferred embodiment of the present invention. As shown in FIG. 1, the electronic equipment 10 includes a cooling module 12, a receiving module 14, and a controller 16. The electronic equipment 10 can be one selected from the group consisting of a projector, a personal computer (PC), a digital light processing (DLP) projector, and an optical disc player.

The cooling module 12 includes a cooling fan 13. The receiving module 14 is used for receiving at least one geographic parameter relative to a location where the electronic equipment 10 is located. The at least one geographic parameter can be one selected from the group consisting of a longitude, a latitude, and an altitude relative to the location.

Figure 2:
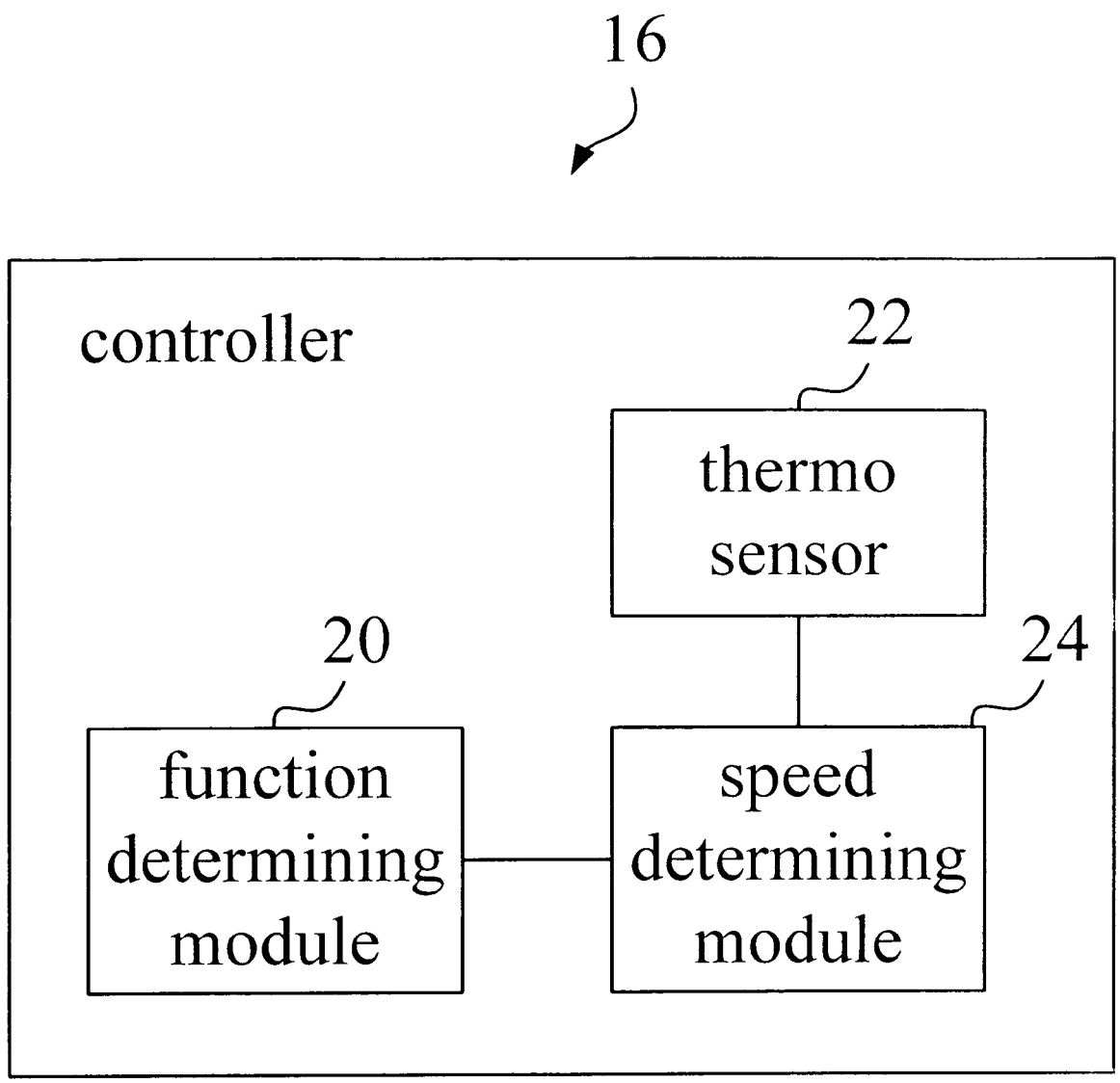
FIG. 2 is a functional block diagram illustrating the controller of the electronic equipment shown in FIG. 1.

Referring to FIG. 1 and FIG. 2, FIG. 2 is a functional block diagram illustrating the controller 16 of the electronic equipment 10 shown in FIG. 1. As shown in FIG. 2, the controller 16 includes a function determining module 20, a thermo sensor 22, and a speed determining module 24. According to the at least one geographic parameter, the function determining module 20 is used for loading a function of speed versus temperature. The thermo sensor 22 is used for sensing a temperature in the electronic equipment 10. The speed determining module 24 is used for calculating an adjusted value by applying the temperature in the function. Afterward, according to the adjusted value, the controller 16 controls the speed of the cooling fan 13 of the cooling module 12.

In an embodiment, the location where the electronic equipment 10 is located is detected by a global positioning system (GPS), and the GPS sends the at least one geographic parameter relative to the detected location to the receiving module 14.

Figure 3:
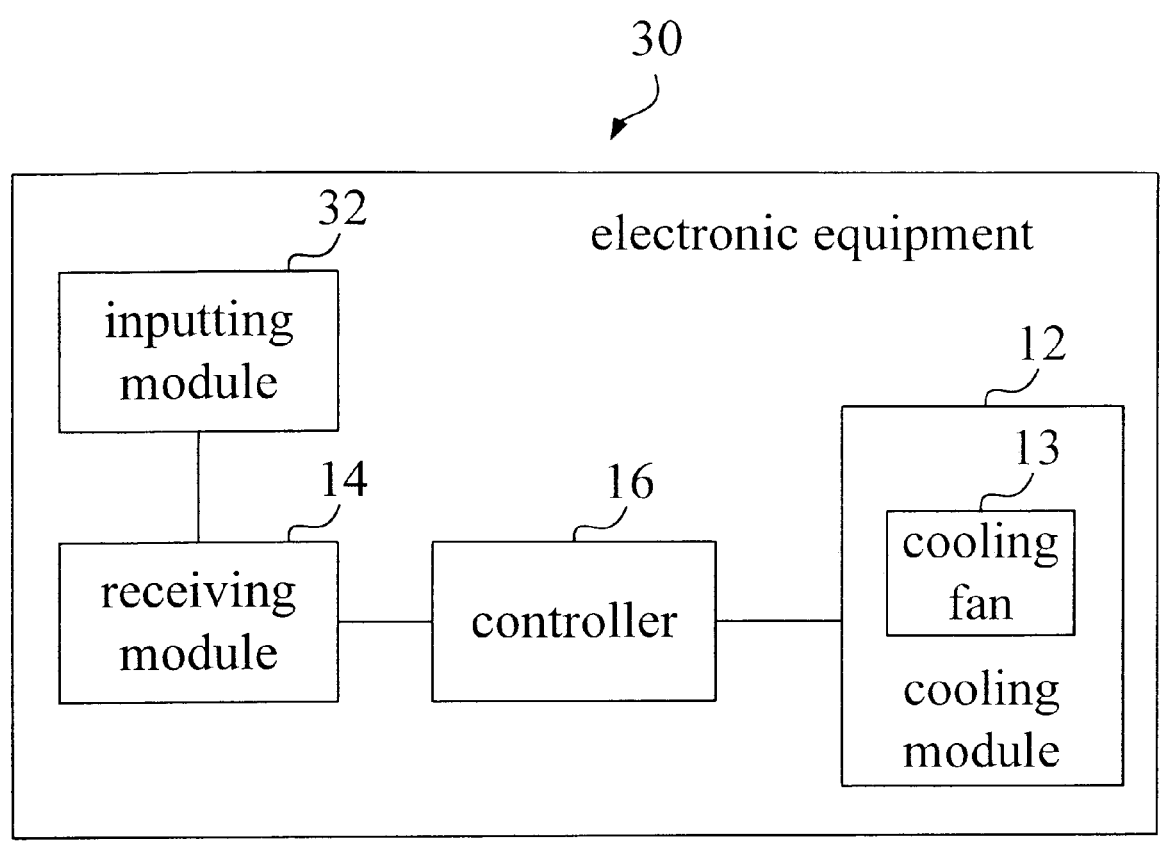
FIG. 3 is a functional block diagram illustrating an electronic equipment according to another preferred embodiment of the present invention.

Referring to FIG. 3, FIG. 3 is a functional block diagram illustrating an electronic equipment 30 according to another preferred embodiment of the present invention. As shown in FIG. 3, the main difference between the electronic equipment 10 and the electronic equipment 30 is that the electronic equipment 30 further includes an inputting module 32. The inputting module 32 is coupled to the receiving module 14 and used for inputting the at least one geographic parameter relative to the location where the electronic equipment 30 is located.

In this embodiment, the location can be represented as a place name, the geographic parameter relative to the location can be a pressure or a temperature of the location, and the electronic equipment 30 can pre-store a plurality of place names and data (e.g. altitude) of each location. Accordingly, a user can use the inputting module 32 to input a place name relative to the location where the electronic equipment 30 is located. After the place name inputted by the inputting module 32 is received, the electronic equipment 30 will look it up in the pre-stored place names and data (e.g. altitude) of each location, so as to find out the pressure and the temperature corresponding to the location where the electronic equipment 30 is located. On the other hand, the electronic equipment 30 can pre-store a plurality of place names and the pressure and the temperature of each location. When the user inputs a place name relative to the location where the electronic equipment 30 is located, the electronic equipment 30 will directly obtain the geographic parameters (i.e. pressure and temperature) relative to the location. Afterward, based on the geographic parameter, the speed of the cooling fan 13 of the cooling module 12 can be controlled appropriately.

Figure 4:
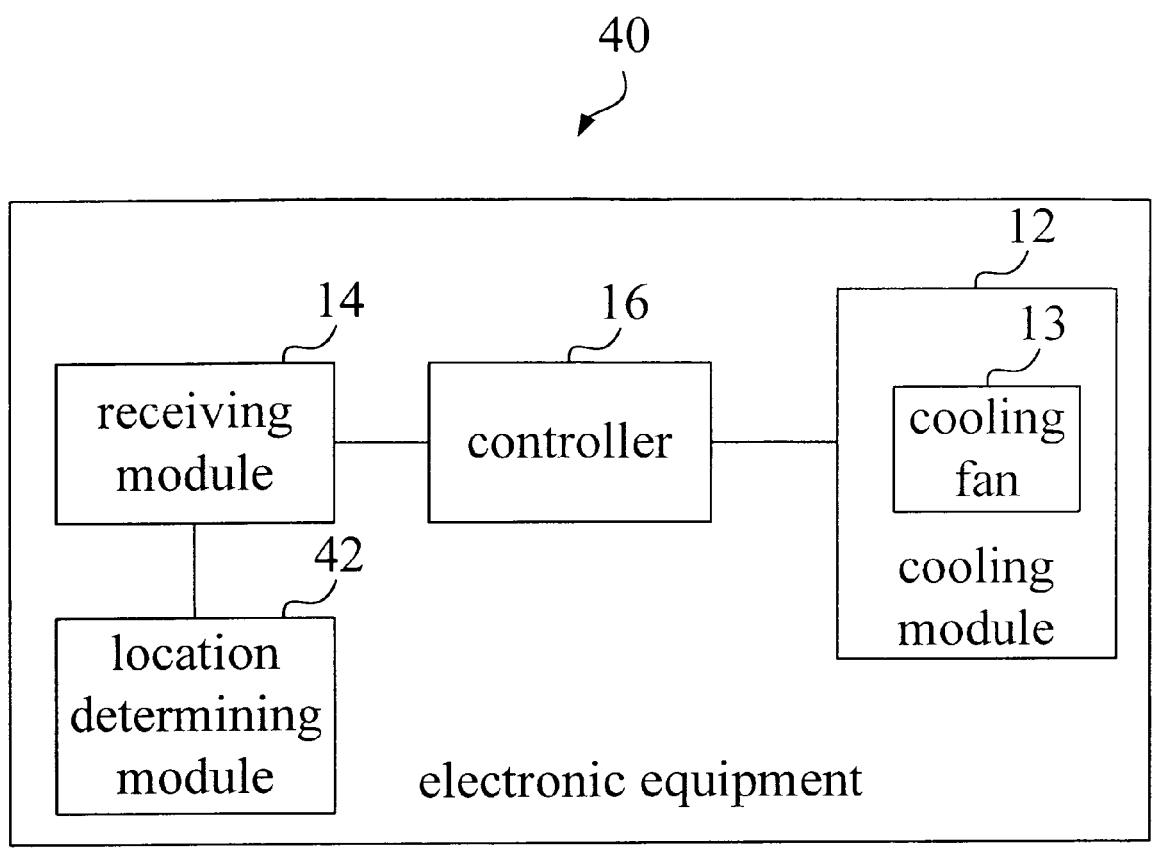
FIG. 4 is a functional block diagram illustrating an electronic equipment according to another preferred embodiment of the present invention.

Referring to FIG. 4, FIG. 4 is a functional block diagram illustrating an electronic equipment 40 according to another preferred embodiment of the present invention. As shown in FIG. 4, the main difference between the electronic equipment 10 and the electronic equipment 40 is that the electronic equipment 40 further includes a location determining module 42. The location determining module 42 is coupled to the receiving module 14 and used for pre-storing N default locations and N sets of geographic parameters, wherein each of the N sets of geographic parameters respectively corresponds to one of the N default locations, and N is a natural number. Moreover, the location determining module 42 is used for sending a set of geographic parameters to the receiving module 14, wherein the set of geographic parameters corresponds to a default location selected as the location where the electronic equipment 40 is located.

Figure 5:
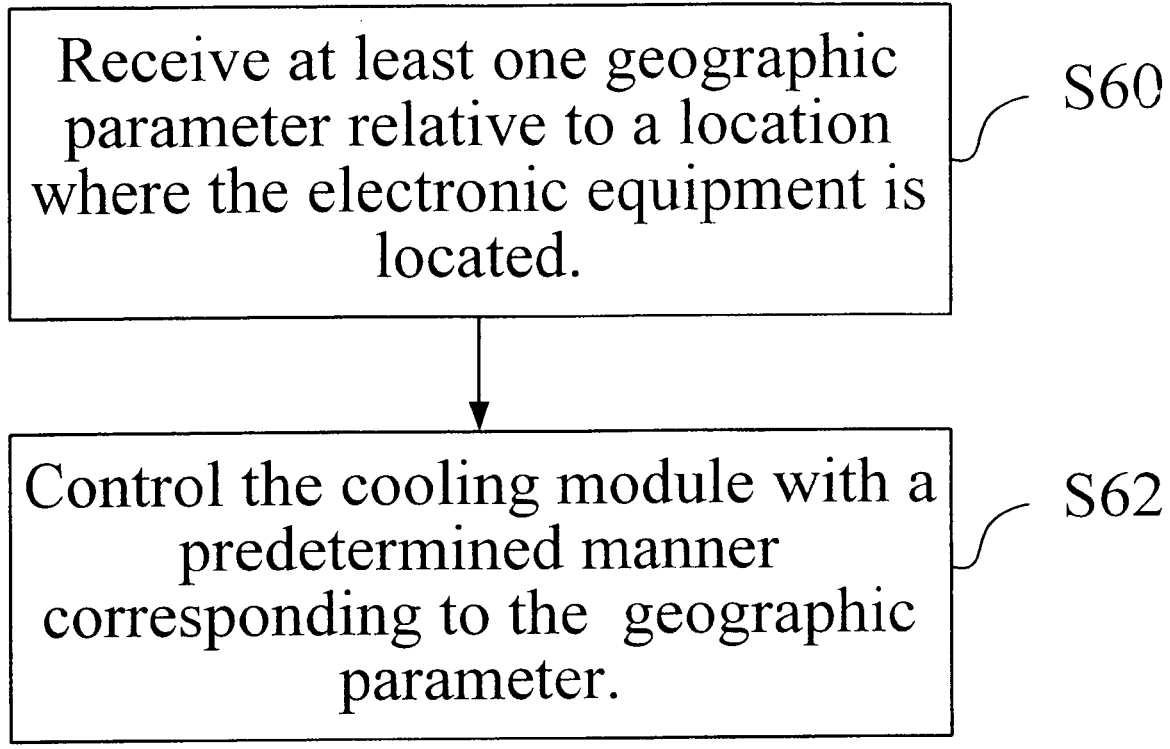
FIG. 5 is a flowchart illustrating the method of the present invention for adjusting a speed of a cooling fan of an electronic equipment.

Referring to FIG. 5, FIG. 5 is a flowchart illustrating the method of the present invention for adjusting a speed of a cooling fan of an electronic equipment. As shown in FIG. 5, the method includes the following steps:

S60: Receive at least one geographic parameter relative to a location where the electronic equipment is located;

S62: Control the cooling module with a predetermined manner corresponding to the at least one geographic parameter.

Figure 6:
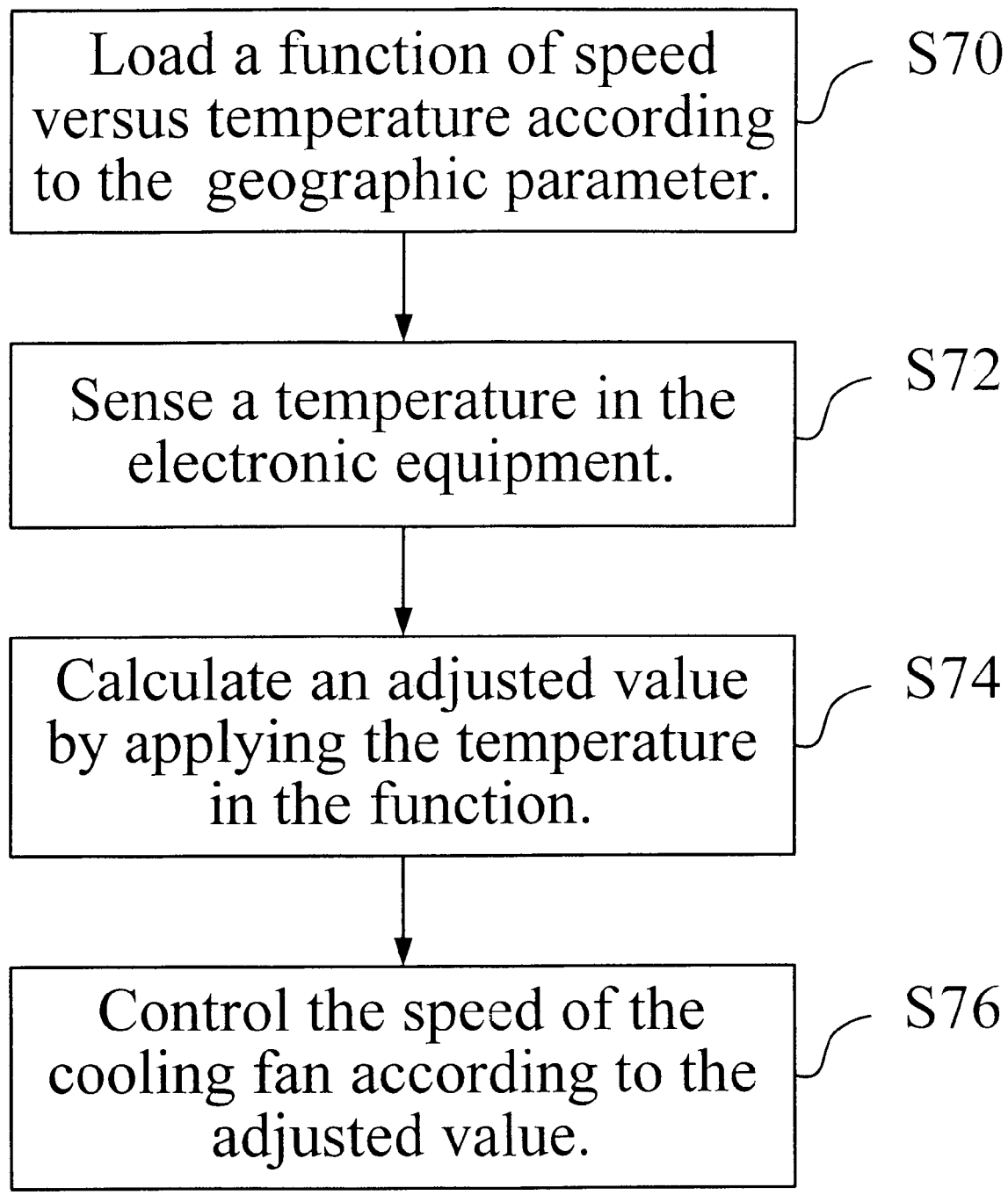
FIG. 6 is a flowchart illustrating the step S62 shown in FIG. 5 in detail.

Referring to FIG. 6, FIG. 6 is a flowchart illustrating the step S62 shown in FIG. 5 in detail. As shown in FIG. 6, the step S62 further includes the following steps:

S70: Load a function of speed versus temperature according to the at least one geographic parameter;

S72: Sense a temperature in the electronic equipment;

S74: Calculate an adjusted value by applying the temperature in the function;

S76: Control the speed of the cooling fan according to the adjusted value.

The above-mentioned predetermined manner means that the speed of the cooling fan of the electronic equipment is controlled according to the adjusted value calculated via the step S74.

The at least one geographic parameter can be one selected from the group consisting of a longitude, a latitude and an altitude relative to the location. The electronic equipment can be one selected from the group consisting of a projector, a PC, a DLP and an optical disc player.

Compared to the prior art, the electronic equipment of the present invention utilizes the receiving module to receive at least one geographic parameter and then, based on the received geographic parameter and the temperature of the electronic equipment, calculates an adjusted value to control the speed of the cooling fan, so as to effectively radiate heat from the electronic equipment. Accordingly, the geographic parameters, which are relative to the location where different electronic equipment is located, are considered for heat radiating, so that the speed of the cooling fan can be controlled to improve heat-radiating efficiency. In other words, no matter where the electronic equipment is located, the present invention can always radiate heat effectively based on the geographic parameters, such as a longitude, a latitude, or an altitude relative to the location.

With the example and explanations above, the features and spirits of the invention will be hopefully well described. Those skilled in the art will readily observe that numerous modifications and alterations of the device may be made while retaining the teaching of the invention. Accordingly, the above disclosure should be construed as limited only by the metes and bounds of the appended claims.

What is claimed is:

1. An electronic equipment, comprising:
    a cooling module comprising a cooling fan;
    a receiving module for receiving at least one geographic parameter relative to a location where the electronic equipment is located; and
    a controller comprising:
        a function determining module for loading, according to the at least one geographic parameter, a function of speed versus temperature;
        a thermo sensor for sensing temperature in the electronic equipment; and
        a speed determining module for calculating an adjusted value by applying the temperature in the function;
    wherein the controller controls the speed of the cooling fan of the cooling module according to the adjusted value.

2. The electronic equipment of claim 1, wherein the at least one geographic parameter is one selected from a group consisting of a longitude, a latitude, and an altitude relative to the location.

3. The electronic equipment of claim 1, wherein the location where the electronic equipment is located is detected by a global positioning system (GPS), and the GPS sends the at least one geographic parameter relative to the detected location to the receiving module.

4. The electronic equipment of claim 1, further comprising an inputting module, coupled to the receiving module, for inputting the at least one geographic parameter relative to the location where the electronic equipment is located.

5. The electronic equipment of claim 1, further comprising a location determining module, coupled to the receiving module, for pre-storing N default locations and N sets of geographic parameters, wherein each of the N sets of geographic parameters respectively corresponds to one of the N default locations, and for sending a set of geographic parameters, which corresponds to a default location selected as the location where the electronic equipment is located, to the receiving module, N being a natural number.

6. The electronic equipment of claim 1, wherein the electronic equipment is one selected from a group consisting of a projector, a personal computer (PC), a digital light processing (DLP) projector, and an optical disc player.

7. A method for adjusting a speed of a cooling fan of an electronic equipment, the method comprising the steps of:
    (a) receiving at least one geographic parameter relative to a location where the electronic equipment is located;
    (b) according to the at least one geographic parameter, loading a function of speed versus temperature;
    (c) sensing a temperature in the electronic equipment;
    (d) calculating an adjusted value by applying temperature in the function; and
    (e) controlling the speed of the cooling fan of the electronic equipment according to the adjusted value.

8. The method of claim 7, wherein the at least one geographic parameter is one selected from a group consisting of a longitude, a latitude, and an altitude relative to the location.

9. The method of claim 7, wherein the electronic equipment is one selected from a group consisting of a projector, a PC, a digital light processing (DLP) projector, and an optical disc player.

10. An electronic equipment comprising:
    a cooling module;
    a receiving module for receiving at least one geographic parameter relative to a location where the electronic equipment is located;
    a location determining module, coupled to the receiving module, for pre-storing N default locations and N sets of geographic parameters, wherein each of the N sets of geographic parameters respectively corresponds to one of the N default locations, and for sending a set of geographic parameters, which corresponds to a default location selected as the location where the electronic equipment is located, to the receiving module, N being a natural number; and
    a controller, according to the at least one geographic parameter, for controlling the cooling module with a predetermined maimer corresponding to the at least one geographic parameter.

11. The electronic equipment of claim 10, wherein the cooling module comprises a cooling fan, and the controller comprises:
    a function determining module for loading, according to the at least one geographic parameter, a function of speed versus temperature;
    a thermo sensor for sensing a temperature in the electronic equipment; and
    a speed determining module for calculating an adjusted value by applying the temperature in the function;
    wherein the predetermined manner means that the controller controls the speed of the cooling fan of the cooling module according to the adjusted value.

12. The electronic equipment of claim 10, wherein the at least one geographic parameter is one selected from a group consisting of a longitude, a latitude, and an altitude relative to the location.

13. The electronic equipment of claim 10, wherein the location where the electronic equipment is located is detected by a global positioning system (GPS), and the GPS sends the at least one geographic parameter relative to the detected location to the receiving module.

14. The electronic equipment of claim 10, further comprising an inputting module, coupled to the receiving module, for inputting the at least one geographic parameter relative to the location where the electronic equipment is located.

15. The electronic equipment of claim 10, wherein the electronic equipment is one selected from a group consisting of a projector, a personal computer (PC), a digital light processing (DLP) projector, and an optical disc player.

* * * * *